United States Patent
Kato et al.

(10) Patent No.: US 10,011,707 B2
(45) Date of Patent: Jul. 3, 2018

(54) RUBBER COMPOSITION AND PNEUMATIC TIRE

(71) Applicant: THE YOKOHAMA RUBBER CO., LTD., Minato-Ku, Tokyo (JP)

(72) Inventors: Manabu Kato, Hiratsuka (JP); Ryota Takahashi, Hiratsuka (JP); Takahiro Okamatsu, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/565,621

(22) PCT Filed: Apr. 13, 2016

(86) PCT No.: PCT/JP2016/061901
§ 371 (c)(1),
(2) Date: Oct. 10, 2017

(87) PCT Pub. No.: WO2016/167282
PCT Pub. Date: Oct. 20, 2016

(65) Prior Publication Data
US 2018/0072874 A1 Mar. 15, 2018

(30) Foreign Application Priority Data
Apr. 13, 2015 (JP) .................. 2015-081873

(51) Int. Cl.
*C08L 15/00* (2006.01)
*B60C 1/00* (2006.01)
*C08L 9/06* (2006.01)
*C08C 19/22* (2006.01)

(52) U.S. Cl.
CPC .............. *C08L 9/06* (2013.01); *B60C 1/0016* (2013.01); *C08C 19/22* (2013.01); *C08L 15/00* (2013.01); *C08L 2205/03* (2013.01); *C08L 2205/06* (2013.01)

(58) Field of Classification Search
CPC ................................. C08C 19/22; C08L 15/00
See application file for complete search history.

(56) References Cited

U.S. PATENT DOCUMENTS

| 6,472,461 | B1 * | 10/2002 | Nakamura | B60C 1/0016 152/209.5 |
| 7,485,684 | B2 * | 2/2009 | Parker | B60C 1/0016 152/564 |
| 9,493,599 | B2 * | 11/2016 | Takahashi | C08F 236/10 |
| 9,701,761 | B2 * | 7/2017 | Takahashi | C08C 19/22 |
| 2016/0355057 | A1 | 12/2016 | Kato et al. | |

FOREIGN PATENT DOCUMENTS

| JP | 2007-039499 A | 2/2007 | |
| JP | 2008-163283 A | 7/2008 | |
| JP | 2013-032471 A | 2/2013 | |
| JP | 5737439 B1 | 6/2015 | |
| WO | WO-2014077364 A1 * | 5/2014 | ............. C08C 19/22 |

* cited by examiner

*Primary Examiner* — Vickey M Nerangis
(74) *Attorney, Agent, or Firm* — Carrier Blackman & Associates, P.C.; Joseph P. Carrier; Anne G. Sabourin

(57) ABSTRACT

An object of the present invention is to provide a rubber composition having excellent processability while excellent heat build-up reduction effect is maintained; and a pneumatic tire that uses the rubber composition. The rubber composition of the present invention contains: a diene rubber containing from 5 to 70 mass % of a modified butadiene rubber obtained by modifying an unmodified butadiene rubber (A) with a carboxy group-containing nitrone compound (B), the unmodified butadiene rubber (A) containing from 2 to 45 parts by mass of an unmodified low molecular weight butadiene rubber (A1) having from 1.5 to 60 mol % of vinyl bonding and having a number average molecular weight (Mn) of 2000 to 60000 per 100 parts by mass of an unmodified butadiene rubber (A2) having a number average molecular weight (Mn) greater than that of the unmodified low molecular weight butadiene rubber (A1).

20 Claims, 1 Drawing Sheet

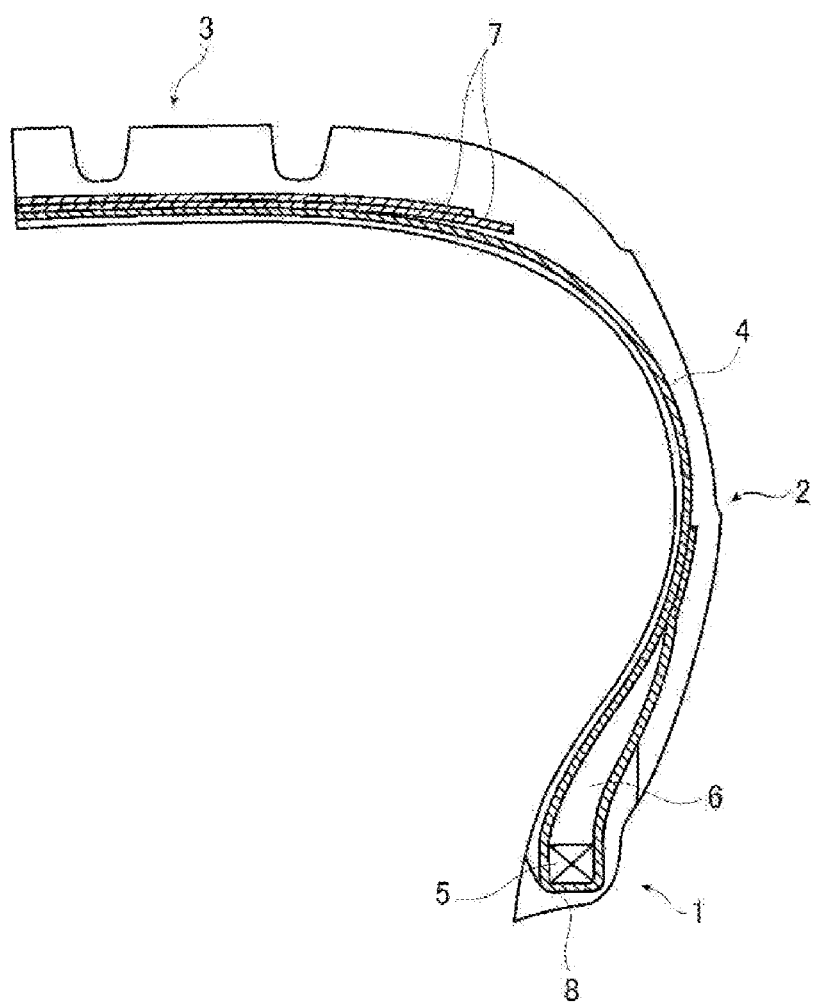

RUBBER COMPOSITION AND PNEUMATIC TIRE

TECHNICAL FIELD

The present invention relates to a rubber composition and a pneumatic tire.

BACKGROUND ART

Modified polymers that are modified by a compound containing a nitrone group (nitrone compound) have been known conventionally as polymers contained in rubber compositions for use in tires and the like.

Patent Document 1, for example, discloses "a rubber composition including, per 100 parts by weight of a diene rubber containing from 5 to 100 wt. % of a modified butadiene rubber, from 10 to 120 parts by weight of a silica; wherein the modified butadiene rubber is butadiene rubber with a cis-content of 90% or greater modified by a nitrone compound having a nitrogen-containing heterocycle per molecule (claim 1)". Additionally, Patent Document 1 describes modification by a nitrone compound causing heat build-up to decrease (paragraph [0006] and the like).

CITATION LIST

Patent Literature

Patent Document 1: JP 2013-032471 A

SUMMARY OF INVENTION

Technical Problem

The inventors of the present invention studied Patent Document 1 described above and has proposed that "a pneumatic tire having excellent wet skid performance while excellent heat build-up reduction effect is maintained can be produced using a rubber composition including a specific amount of modified butadiene rubber modified using a carboxy group-containing nitrone compound" in JP 2014-016822.

However, it was found that, although the rubber composition containing the modified butadiene rubber obtained by modifying a butadiene rubber using a carboxy group-containing nitrone compound exhibits excellent characteristics of heat build-up and the like, the Mooney viscosity tends to increase, and thus further enhancement in processability is required. Furthermore, it was also found that the modified butadiene rubber itself may exhibit poor processability during rolling process after being kneaded in the production, and enhancement in processability of the modified butadiene rubber which is a rubber blending ingredient is also required.

Therefore, an object of the present invention is to provide a rubber composition having excellent processability while excellent heat build-up reduction effect is maintained; and a pneumatic tire that uses the rubber composition.

Solution to Problem

As a result of diligent research on the problems described above, the inventors of the present invention found that a rubber composition having excellent processability while excellent heat build-up reduction effect is maintained can be obtained by, in a rubber composition containing, in a diene rubber, a particular amount of modified butadiene rubber obtained by modifying an unmodified butadiene rubber with a carboxy group-containing nitrone compound, using a low molecular weight butadiene rubber having particular characteristics as a part of the unmodified butadiene rubber, and thus completed the present invention. Furthermore, the inventors found that the modified butadiene rubber obtained by modifying an unmodified butadiene rubber containing a low molecular weight butadiene rubber with a carboxy group-containing nitrone compound exhibits excellent processability as a rubber blending ingredient.

Specifically, the inventors found that the problem described above can be solved by the following features.

(1) A rubber composition including: a diene rubber containing from 5 to 70 mass % of a modified butadiene rubber obtained by modifying an unmodified butadiene rubber (A) with a carboxy group-containing nitrone compound (B), the unmodified butadiene rubber (A) containing from 2 to 45 parts by mass of an unmodified low molecular weight butadiene rubber (A1) having from 1.5 to 60 mol % of vinyl bonding and having a number average molecular weight (Mn) of 2000 to 60000 per 100 parts by mass of an unmodified butadiene rubber (A2) having a number average molecular weight (Mn) greater than the number average molecular weight (Mn) of the unmodified low molecular weight butadiene rubber (A1).

(2) The rubber composition according to (1) further including a white filler.

(3) The rubber composition according to (1) or (2), where the nitrone compound (B) is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

(4) The rubber composition according to any one of (1) to (3), where
a degree of modification of the modified butadiene rubber is from 0.01 to 2.0 mol %,
the degree of modification representing a proportion (mol %) of double bonds modified with the nitrone compound (B) relative to all the double bonds derived from conjugated diene contained in the unmodified butadiene rubber (A).

(5) The rubber composition according to any one of (1) to (4), where an amount of the nitrone compound (B) reacted to the unmodified butadiene rubber (A) is from 0.3 parts by mass to 10 parts by mass per 100 parts by mass of the unmodified butadiene rubber (A).

(6) The rubber composition according to any one of (2) to (5), where a content of the white filler is from 8 to 130 parts by mass per 100 parts by mass of the modified butadiene rubber.

(7) A pneumatic tire using the rubber composition described in any one of (1) to (6).

Advantageous Effects of Invention

As described below, according to the present invention, a rubber composition having excellent processability while excellent heat build-up reduction effect is maintained; and a pneumatic tire that uses the rubber composition can be provided.

BRIEF DESCRIPTION OF DRAWING

FIG. 1 is a partial cross-sectional schematic view of a tire that illustrates one embodiment of a pneumatic tire of the present invention.

DESCRIPTION OF EMBODIMENTS

Hereinafter, a rubber composition and a pneumatic tire including the rubber composition of the present invention will be described.

Note that, in the present specification, numerical ranges indicated using "(from) . . . to . . . " include the former number as the lower limit value and the later number as the upper limit value.

Rubber Composition

The rubber composition of the present invention is a rubber composition containing: a diene rubber containing from 5 to 70 mass % of a modified butadiene rubber obtained by modifying an unmodified butadiene rubber (A) with a carboxy group-containing nitrone compound (B), the unmodified butadiene rubber (A) containing from 2 to 45 parts by mass of an unmodified low molecular weight butadiene rubber (A1) having from 1.5 to 60 mol % of vinyl bonding and having a number average molecular weight (Mn) of 2000 to 60000 per 100 parts by mass of an unmodified butadiene rubber (A2) having a number average molecular weight (Mn) that is greater than a number average molecular weight (Mn) of the unmodified low molecular weight butadiene rubber (A1).

Since the rubber composition of the present invention contains a particular amount of such a modified butadiene rubber as a diene rubber component, excellent processability can be achieved while excellent heat build-up reduction effect is maintained. Although the reason for this is unknown, the reason is presumed to be as follows.

As described in JP 2014-016822 A that has been filed, it is supposed that, when a butadiene rubber is modified using a carboxy group-containing nitrone compound, white fillers (especially, silica) and other fillers (especially, carbon black) that are added as optional components during preparation of a compound are readily incorporated. As a result, it is conceived that dispersibility of these fillers becomes excellent, thereby reducing the heat build-up.

Meanwhile, when a butadiene rubber containing a low molecular weight butadiene rubber is modified using a carboxy group-containing nitrone compound, the nitrone compound mainly reacts with a vinyl group present in the butadiene rubber containing the low molecular weight butadiene rubber. At this time, the carboxy group derived from the nitrone compound contained in the low molecular weight butadiene rubber which is a low molecular chain and the carboxy group derived from the nitrone compound contained in the butadiene rubber having a high molecular chain (butadiene rubber having a higher number average molecular weight than that of the low molecular weight butadiene rubber) form a fine network due to the intermolecular interaction. That is, it is conceived that, by introducing a nitrone modified product of a low molecular weight butadiene rubber which is a low molecular chain, a loose network is formed compared to a firm network consisting only of high molecular chain butadiene rubbers, thereby enhancing processability. Furthermore, recently, the inventors found that when the number average molecular weight of the low molecular weight butadiene rubber is not within the predetermined range or when the vinyl bond content is not within the predetermined range, the effect described above is less likely to be exhibited.

The effect described above is obvious from the examples described below, i.e., it is also supposed from the fact that the rubber composition in which an unmodified low molecular weight butadiene rubber is blended in a butadiene rubber modified with a carboxy group-containing nitrone compound cannot enhance processability as shown in Comparative Examples 11 to 13, and effect of enhancing processability cannot be achieved depending on the characteristics of the low molecular weight butadiene rubber even when the low molecular weight butadiene rubber modified with a carboxy group-containing nitrone compound is used as shown in Comparative Examples 2 to 5.

The diene rubber, the modified butadiene rubber and the preparation method thereof, and other additives including white fillers are described below.

Diene Rubber

There are no particular restrictions to the diene rubber contained in the rubber composition of the present invention as long as it contains from 5 to 70 mass % of the modified butadiene rubber described below and has double bonds in the main chain thereof, and specific examples thereof include natural rubbers (NR), isoprene rubbers (IR), unmodified butadiene rubbers, acrylonitrile-butadiene rubbers (NBR), styrene-butadiene rubbers (SBR), styrene-isoprene rubbers (SIR), styrene-isoprene-butadiene rubbers (SIBR), and the like. One type of these may be used alone, or two or more types of these may be used in combination.

Among these diene rubbers, as a diene rubber used in combination with the modified butadiene rubber described below, natural rubber (NR), isoprene rubber (IR), and styrene-butadiene rubber (SBR) are preferable.

In the present invention, the content of the modified butadiene rubber described below in the diene rubber is from 5 to 70 mass %, preferably from 5 to 40 mass %, more preferably from 5 to 30 mass %, even more preferably from 5 to 20 mass %, and most preferably from 10 to 20 mass %.

Modified Butadiene Rubber

The modified butadiene rubber contained in the rubber composition of the present invention is a modified polymer obtained by modifying an unmodified butadiene rubber (A) with a nitrone compound (B) having a carboxy group.

Unmodified Butadiene Rubber (A)

The unmodified butadiene rubber (A) described above is a butadiene rubber containing a carbon-carbon unsaturated bond.

Note that "unmodified" refers to a state that is not modified with the nitrone compound (B) described below, and the word "unmodified" does not exclude polymers that have been modified with other components (especially terminal-modified polymers).

The unmodified butadiene rubber (A) described above is preferably a butadiene rubber with a high cis structure, as in Patent Document 1, and is specifically a butadiene rubber with a cis-1,4 bond content of 90% or greater and preferably 95% or greater, because such an unmodified butadiene rubber has increased heat build-up reduction properties.

Note that such a butadiene rubber with a high cis structure can be polymerized by a typical method using a Ziegler catalyst, neodymium catalyst, or the like.

The unmodified butadiene rubber (A) contains an unmodified low molecular weight butadiene rubber (A1) having from 1.5 to 60 mol % of vinyl bonding and having a number average molecular weight (Mn) of 2000 to 60000, and an unmodified butadiene rubber (A2) having a number average molecular weight (Mn) that is greater than that of the unmodified low molecular weight butadiene rubber (A1) (hereinafter, also simply referred to as "unmodified butadiene rubber (A2)").

In the unmodified butadiene rubber (A), the compounded amount of the unmodified low molecular weight butadiene rubber (A1) is from 2 to 45 parts by mass, preferably from 5 to 40 parts by mass, and more preferably from 8 to 40 parts by mass, per 100 parts by mass of the unmodified butadiene rubber (A2). When the compounded amount of the unmodified low molecular weight butadiene rubber (A1) is less than 2 parts by mass per 100 parts by mass of the unmodified butadiene rubber (A2), effect of enhancing processability is less likely to be exhibited, and when the compounded amount is greater than 45 parts by mass, adhesivity increases and processability deteriorates.

The vinyl bond content in the unmodified low molecular weight butadiene rubber (A1) is from 1.5 to 60 mol %, preferably from 15 to 56 mol %, and more preferably from 25 to 56 mol %. Note that "vinyl bond content" refers to a proportion of 1,2-vinyl bond among cis-1,4 bond, trans-1,4-bond, and 1,2-vinyl bond which are bonding forms of butadiene. By setting the vinyl bond content in the unmodified low molecular weight butadiene rubber (A1) to the range described above, excellent effect of enhancing processability is achieved.

Furthermore, the number average molecular weight (Mn) of the unmodified low molecular weight butadiene rubber (A1) is from 2000 to 60000, preferably from 2000 to 40000, and more preferably from 2500 to 25000. By setting the number average molecular weight (Mn) to the range described above, processability and low heat build-up can be balanced.

On the other hand, the number average molecular weight (Man) of the unmodified butadiene rubber (A2) is not particularly limited as long as it is greater than the number average molecular weight (Mn) of the unmodified low molecular weight butadiene rubber (A1) but is preferably greater than 60000, more preferably from 100000 to 250000, and even more preferably from 120000 to 200000.

Furthermore, the weight average molecular weight (Mw) of the unmodified butadiene rubber (A2) is preferably from 50000 to 1000000, and more preferably from 200000 to 800000. By setting the weight average molecular weight (Mw) to the range, wear resistance and low-temperature properties of the butadiene rubber can be further enhanced.

Note that, in the present invention, the weight average molecular weight (Mw) and the number average molecular weight (Mn) are values determined by gel permeation chromatography (GPC) measurement, measured based on calibration with polystyrene standard. Furthermore, as the measurement instrument, three columns (MIXED-B, manufactured by Polymer Laboratories) are connected in a series, a differential refractometer (RI-8020, manufactured by Tosoh Corporation) is used as a detector, tetrahydrofuran is used as an eluent, and a column temperature of 40° C. is employed.

Nitrone Compound (B)

The nitrone compound (B) described above is not particularly limited as long as the nitrone compound (B) is a nitrone having at least one carboxy group (—COOH) (hereinafter, also referred to as "carboxynitrone" for convenience). For example, a carboxynitrone represented by Formula (b) below is suitable for use. Note that "nitrone" is a generic term for compounds in which an oxygen atom is bonded to a nitrogen atom of a Schiff base.

[Chemical Formula 1]

In Formula (b), m and n each independently represent an integer of 0 to 5, and the sum of m and n is 1 or greater.

The integer represented by m is preferably an integer of 0 to 2, and more preferably an integer of 0 or 1, because solubility to a solvent during nitrone compound synthesis is better, thereby making the synthesis easier.

The integer represented by n is preferably an integer of 0 to 2, and more preferably an integer of 0 or 1, because solubility to a solvent during nitrone compound synthesis is better, thereby making the synthesis easier.

Furthermore, the sum of m and n (m+n) is preferably from 1 to 4, and more preferably 1 or 2.

The compound is not particularly limited to a carboxynitrone such as that represented by Formula (b) but is preferably a compound selected from the group consisting of N-phenyl-α-(4-carboxyphenyl)nitrone represented by Formula (b1) below, N-phenyl-α-(3-carboxyphenyl)nitrone represented by Formula (b2) below, N-phenyl-α-(2-carboxyphenyl)nitrone represented by Formula (b3) below, N-(4-carboxyphenyl)-α-phenylnitrone represented by Formula (b4) below, N-(3-carboxyphenyl)-α-phenylnitrone represented by Formula (b5) below, and N-(2-carboxyphenyl)-α-phenylnitrone represented by Formula (b6) below.

[Chemical Formula 2]

The method of synthesizing the nitrone compound (B) is not particularly limited, and conventionally known methods can be used. For example, nitrones having a nitrone group are obtained by stirring a compound having a hydroxyamino group (—NHOH) and a compound having an aldehyde group (—CHO) at a molar ratio of hydroxyamino groups to aldehyde groups (—NHOH/—CHO) of 1.0 to 1.5 in the presence of an organic solvent (e.g. methanol, ethanol, and tetrahydrofuran) at room temperature for 1 to 24 hours to allow the both groups to react.

Method of Preparing Modified Butadiene Rubber

The method for producing modified butadiene rubber is not limited to a particular method. Examples of the method include blending the unmodified butadiene rubber (A) described above and the nitrone compound (B) at a temperature of from 100 to 200° C. for from 1 to 30 minutes.

When blended as such, a cycloaddition reaction occurs between the double bond derived from the conjugated diene contained in the unmodified butadiene rubber (A) and the nitrone group contained in the nitrone compound (B), forming a five-membered ring as illustrated in Formulas (I) and (II) below. Note that Formula (I) below represents a reaction between a 1,4 bond and a nitrone compound, and Formula (II) below represents a reaction between a 1,2-vinyl bond and a nitrone compound. Furthermore, Formulas (I) and (II) illustrate the reactions for the case where the butadiene is 1,3-butadiene, but the same reaction leads to a formation of a five-membered ring even in the case where the butadiene is other than 1,3-butadiene.

[Reaction Scheme 3]

The amount of the nitrone compound (B) used to modify the unmodified butadiene rubber (A) (hereinafter, also referred to as "converted CPN amount") is preferably from 0.1 to 10 parts by mass, and more preferably from 0.3 to 3 parts by mass, per 100 parts by mass of the diene rubber. By setting the converted CPN amount to the range described above, the modification can be performed efficiently.

For example, if 35 parts by mass of the modified butadiene rubber is contained per 100 parts by mass of the diene rubber and the modified butadiene rubber is obtained via the reaction between 100 parts by mass of the unmodified butadiene rubber (A) and 1 part by mass of the nitrone compound (B), since 0.35 parts by mass (=35×(1/101)) of nitrone compound (B) is used for synthesis of the modified butadiene rubber among 35 parts by mass of the modified butadiene rubber, the converted CPN amount is 0.35 parts by mass.

Here, the amount (charged amount) of the nitrone compound (B) reacted with the unmodified butadiene rubber (A) is preferably from 0.3 to 10 parts by mass and more preferably from 0.3 to 5 parts by mass, per 100 parts by mass of the unmodified butadiene rubber (A).

In the present invention, the degree of modification of the modified butadiene rubber prepared in such a manner is not particularly limited. However, from the perspective of increasing the heat build-up reduction properties, the degree of modification is preferably from 0.01 to 2.0 mol %, and more preferably from 0.02 to 1.5 mol %.

Here, "degree of modification" refers to the proportion (mol %) of the double bonds modified with the nitrone compound (B) relative to all the double bonds derived from the conjugated diene contained in the unmodified butadiene rubber (A), and specifically, the proportion (mol %) of structures of Formula (I) or Formula (II) above formed via modification by the nitrone compound (B). The degree of modification, for example, can be found by performing NMR measurement of the unmodified butadiene rubber (A) and the modified butadiene rubber (i.e., the polymer before and after modification).

White Filler

The rubber composition of the present invention preferably further contains a white filler.

Specific examples of the white filler include silica, calcium carbonate, magnesium carbonate, talc, clay, alumina, aluminum hydroxide, titanium oxide, calcium sulfate, and the like. One type of these may be used alone or two or more types of these may be used in combination.

Among these examples, silica is preferable because of its interaction with the modified group (carboxy group) of the modified butadiene rubber.

Specific examples of the silica include wet silica (hydrous silicic acid), dry silica (silicic anhydride), calcium silicate, aluminum silicate, and the like. One type of these may be used alone or two or more types of these may be used in combination.

In the present invention, the content of the white filler described above is preferably from 8 to 130 parts by mass, and more preferably from 30 to 100 parts by mass, per 100 parts by mass of the diene rubber described above.

Carbon Black

The rubber composition of the present invention preferably contains a carbon black.

The carbon black is not particularly limited and, for example, carbon blacks of various grades, such as SAF-HS, SAF, ISAF-HS, ISAF, ISAF-LS, IISAF-HS, HAF-HS, HAF, HAF-LS, and FEF, can be used.

The content of the carbon black is not particularly limited, but is preferably from 1 to 80 parts by mass, and more preferably from 3 to 50 parts by mass, per 100 parts by mass of the diene rubber described above.

Silane Coupling Agent

When the rubber composition of the present invention contains the white filler (especially silica) described above, the rubber composition preferably contains a silane coupling agent because it improves the reinforcing performance of the tire.

When the silane coupling agent is used, the content thereof is preferably from 3 to 15 parts by mass, and more preferably from 4 to 10 parts by mass, per 100 parts by mass of the white filler described above.

Specific examples of the above silane coupling agent include bis(3-triethoxysilylpropyl)tetrasulfide, bias(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropyl benzothiazole tetrasulfide, and the like. One of these examples can be used alone, or a combination of two or more can be used.

Among these, from the perspective of enhancing effect on reinforcing properties, use of bis-(3-triethoxysilylpropyl)tetrasulfide and/or bis-(3-triethoxysilylpropyl)disulfide is preferable. Specific examples thereof include Si69 (bis(3-triethoxysilylpropyl)tetrasulfide, manufactured by Evonik Degussa), Si75 (bis(3-triethoxysilylpropyl)disulfide, manufactured by Evonik Degussa), and the like.

Other Additives

Besides the diene rubber, the white filler, the carbon black, and the silane coupling agent described above, the rubber composition of the present invention may contain various other additives typically used in a rubber composition for a tire including a filler such as calcium carbonate; a vulcanizing agent such as sulfur; a sulfenamide-based, guanidine-based, thiazole-based, thiourea-based, or thiuram-based vulcanization accelerator; a vulcanization accelerator aid such as zinc oxide and stearic acid; wax; aroma oil, an anti-aging agent; and a plasticizer.

The compounded amount of these additives may be any conventional amount, as long as the object of the present invention is not impaired. For example, the compounded amounts per 100 parts by mass of the diene rubber may be:

sulfur: from 0.5 to 5 parts by mass,
vulcanization accelerator: from 0.1 to 5 parts by mass,
vulcanization accelerator aid: from 0.1 to 10 parts by mass,
anti-aging agent: from 0.5 to 5 parts by mass,
wax: from 1 to 10 parts by mass, and
aroma oil: from 5 to 30 parts by mass.

Method of Producing Rubber Composition

The method of producing the rubber composition of the present invention is not particularly limited, and specific examples thereof include a method whereby each of the above-mentioned components is kneaded using a publicly known method and device (e.g. Banbury mixer, kneader, and roller). When the composition of the present invention contains sulfur or a vulcanization accelerator, the components other than the sulfur and the vulcanization accelerator are preferably blended first (for example, blended at a temperature of from 60 to 160° C.), then cooled, before blending the sulfur and the vulcanization accelerator.

In addition, the composition of the present invention can be vulcanized or crosslinked under conventionally known vulcanizing or crosslinking conditions.

Pneumatic Tire

The pneumatic tire of the present invention is a pneumatic tire that includes the composition of the present invention. Moreover, the pneumatic tire of the present invention is preferably a pneumatic tire that includes the composition of the present invention in the tire tread.

FIG. 1 is a partial cross-sectional schematic view of a tire that represents one embodiment of the pneumatic tire of the present invention, but the pneumatic tire of the present invention is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in parts of the bead portions 1 that are in contact with a rim.

The pneumatic tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

The present invention is described below in detail using examples. However, the present invention is not limited to these examples.

Synthesis of Nitrone Compound (Carboxynitrone)

In a 2 L eggplant-shaped flask, methanol heated to 40° C. (900 mL) was placed, and then terephthalaldehydic acid represented by Formula (2) below (30.0 g) was added and dissolved. To this solution, a solution in which phenylhydroxylamine represented by Formula (1) below (21.8 g) was dissolved in methanol (100 mL) was added and stirred at room temperature for 19 hours. After the completion of stirring, the nitrone compound represented by Formula (3) below (41.7 g) was obtained by recrystallization from methanol. The yield was 86%.

[Chemical Formula 4]

Synthesis of Modified Butadiene Rubber 1 (Modified BR 1)

In a Banbury mixer at 120° C., 8.1 parts by mass of low molecular weight butadiene rubber (low molecular weight BR 1: Ricon 130, manufactured by Cray Valley; vinyl bond content: 28 mol %; number average molecular weight: 2500) and 100 parts by mass of butadiene rubber having a number average molecular weight greater than that of the low molecular weight butadiene rubber described above (BR 1 (hereinafter, also referred to as "other butadiene rubber"); Nipol BR 1220, manufactured by Zeon Corporation; number average molecular weight: $1.8 \times 10^5$) were placed and masticated for 2 minutes to prepare a butadiene rubber mixture.

Thereafter, the nitrone compound (CPN) synthesized as described above was added in an amount of 1.2 parts by mass per 100 parts by mass total of the low molecular weight butadiene rubber and another butadiene rubber and mixed at 160° C. for 5 minutes to modify the butadiene rubber mixture with a nitrone compound, thereby obtaining a modified butadiene rubber (modified butadiene rubber 1 (modified BR 1)).

The obtained modified butadiene rubber 1 was measured by NMR and the degree of modification was determined. The degree of modification of the modified butadiene rubber 1 was 0.12 mol %. Specifically, the degree of modification was determined as described below. The degree of modification was determined by measuring the peak area (derived from two protons adjacent to the carboxy group) at around 8.08 ppm via $^1$H-NMR analysis (CDCl$_3$, 400 MHz, TMS) for the polymer before and after the modification, using CDCl$_3$ as a solvent. Note that the $^1$H-NMR analysis of the modified butadiene rubber was performed by using a sample obtained by dissolving the modified butadiene rubber in toluene, performing purification by methanol precipitation twice, and then drying under reduced pressure.

Synthesis of Modified Butadiene Rubber 2 (Modified BR 2)

A modified butadiene rubber 2 (modified BR 2) was obtained by the same method and blending as those in the modified butadiene rubber 1 except for changing the low molecular weight BR 1 to another low molecular weight butadiene rubber (low molecular weight BR 2: Ricon 142, manufactured by Cray Valley; vinyl bond content: 55 mol %; number average molecular weight: 3900) in the synthesis of the modified butadiene rubber 1 (modified BR 1). The degree of modification of the modified butadiene rubber 2 was 0.11 mol %.

Synthesis of Modified Butadiene Rubber 3 (Modified BR 3)

A modified butadiene rubber 3 (modified BR 3) was obtained by the same method and blending as those in the modified butadiene rubber 1 except for changing the low molecular weight BR 1 and the other butadiene rubber to a butadiene rubber in which a low molecular weight component and a high molecular weight component were mixed (BR 2: Nipol BRX 5000 (manufactured by Zeon Corporation)) in the synthesis of the modified butadiene rubber 1 (modified BR 1). The degree of modification of the modified butadiene rubber 3 was 0.14 mol %.

Synthesis of Comparative Modified Butadiene Rubbers 1 to 4 (Comparative Modified BRs 1 to 4)

Comparative modified butadiene rubbers 1 to 4 (comparative modified BRs 1 to 4) were synthesized by the same method and blending as those in the modified butadiene rubber 1 except for changing the composition of the low molecular weight BR 1 to the composition shown in Table 1 (each component will be described below) in the synthesis of the modified butadiene rubber 1 (modified BR 1) described above. Note that, in the comparative modified butadiene rubber 1 (comparative modified BR 1), the low molecular weight butadiene rubber was not compounded and, in the comparative modified butadiene rubber 2 (comparative modified BR 2), an oil was used in place of the low molecular weight butadiene rubber (oil content in the comparative modified BR 2 of Table 2 was 2 parts by mass). The degrees of modification of the comparative modified butadiene rubbers 1 to 4 were respectively 0.11 mol %, 0.12 mol %, 0.11 mol %, and 0.11 mol %.

For each of the obtained modified butadiene rubbers, processability was evaluated by the method described below.

Processability of Modified Polymer

"A": Workability by a roll was excellent.

"B": The modified butadiene rubber was wounded up by a roll but sagged like a bag, and workability by the roll was poor.

"C": The modified butadiene rubber was not wounded up by a roll and was dried and could not be formed into a shape.

"D": The modified butadiene rubber was adhered to a roll, and workability by the roll was poor.

"E": The modified butadiene rubber was firmly adhered to a roll and finely broken during removal from the roll.

The charged amounts of the modified butadiene rubbers 1 to 3 and the comparative modified butadiene rubbers 1 to 4 as well as evaluation of processability of each modified butadiene rubber obtained are shown together in Table 1.

TABLE 1

| Table 1 (part by mass) | Comparative modified BR 1 | Comparative modified BR 2 | Comparative modified BR 3 | Comparative modified BR 4 | Modified BR 1 | Modified BR 2 | Modified BR 3 |
|---|---|---|---|---|---|---|---|
| BR 1 | 100.00 | 100.00 | 92.50 | 92.50 | 92.50 | 92.50 | |
| BR 2 | | | | | | | 100.00 |
| CPN | 1.20 | 1.20 | 1.20 | 1.20 | 1.20 | 1.20 | 1.20 |
| Low molecular weight BR 1 | | | | | 7.50 | | |
| Low molecular weight BR 2 | | | | | | 7.50 | |
| Low molecular weight BR 3 | | | 7.50 | | | | |
| Low molecular weight BR 4 | | | | 7.50 | | | |
| Oil | | 8.00 | | | | | |
| Degree of modification | 0.11 | 0.12 | 0.11 | 0.11 | 0.12 | 0.11 | 0.14 |
| Processability of modified polymer | B | D | D | E | A | A | A |

*In the comparative modified BR 3 and BR 4 and modified BR 1 and BR 2, the amount of the low molecular weight BR was 8.1 parts by mass per 100 parts by mass of the high molecular weight BR.

As is clear from the results shown in Table 1 above, it was found that the processability was excellent for the modified butadiene rubbers (modified BRs 1, 2, and 3) obtained by modifying butadiene rubber having a predetermined amount of a low molecular weight butadiene rubber having particular characteristics with a nitrone compound (note that "processability of modified polymer" shown in Table 2 is the same as the evaluation results of "processability of modified polymer" shown in Table 1 above).

The details of each component shown in Table 1 above are as follows.

BR 1: Nipol BR 1220 (number average molecular weight: $1.8 \times 10^5$, manufactured by Zeon Corporation)

BR 2: Nipol BRX 5000 (a product obtained by blending 40 parts by mass of low molecular weight butadiene rubber (weight average molecular weight: $2.0 \times 10^4$; number average molecular weight: $1.1 \times 10^4$) to 100 parts by mass of high molecular weight butadiene rubber (weight average molecular weight: $7.4 \times 10^5$; number average molecular weight: $2.5 \times 10^5$) (manufactured by Zeon Corporation))

CPN: Nitrone compound synthesized as described above (carboxynitrone)

Low molecular weight BR 1: Ricon 130 (vinyl bond content: 28 mol %; number average molecular weight: 2500 (manufactured by Cray Valley))

Low molecular weight BR 2: Ricon 142 (vinyl bond content: 55 mol %; number average molecular weight: 3900 (manufactured by Cray Valley))

Low molecular weight BR 3: Ricon 150 (vinyl bond content: 70 mol %; number average molecular weight: 3900 (manufactured by Cray Valley))

Low molecular weight BR 4: Ricon 154 (vinyl bond content: 90 mol %; number average molecular weight: 5200 (manufactured by Cray Valley))

Oil: Extract No. 4S (manufactured by Showa Shell Sekiyu K.K.)

Standard Example 1 (Comparative Example 1), Comparative Examples 2 to 15, and Examples 1 to 3

The components shown in Table 2 below were blended at the proportions (part by mass) shown in Table 2 below.

Specifically, the components shown in Table 2 below except the sulfur and the vulcanization accelerator were first mixed in a Bunbury mixer at 80° C. for 5 minutes. Thereafter, a roll was used to mix the sulfur and the vulcanization accelerator to obtain a rubber composition.

Note that "modified low molecular weight BR" in the table was a substance obtained by being modified by the method described below.

Synthesis of Modified Low Molecular Weight BR

In a Banbury mixer at 120° C., 100 parts by mass of low molecular weight butadiene rubber (low molecular weight BR 1: Ricon 130, manufactured by Cray Valley; vinyl bond content: 28 mol %; number average molecular weight: 2500) was placed and masticated for 2 minutes. Thereafter, the nitrone compound synthesized as described above was added in an amount of 1.2 parts by mass per 100 parts by mass of the low molecular weight butadiene rubber (low molecular weight BR 1) and mixed at 160° C. for 5 minutes to modify the low molecular weight butadiene rubber (low molecular weight BR 1) with a nitrone compound, thereby obtaining a modified low molecular weight butadiene rubber (modified low molecular weight BR).

When NMR analysis was performed for the obtained modified low molecular weight BR to determine the degree of modification, the degree of modification for the modified low molecular weight BR was 0.10 mol %.

Processability of Compound (Processability of Each Rubber Composition)

Each of the obtained (unvulcanized) rubber compositions, was evaluated for processability as a compound by measuring the Mooney viscosity (ML).

The Mooney viscosity of each of the obtained rubber compositions was measured in accordance with JIS K6300 using an L-type rotor (diameter: 38.1 mm, thickness: 5.5 mm) in a Mooney viscometer under the conditions of a preheating time of 1 minute, a rotor rotation time of 4 minutes, 100° C., and 2 rpm.

Production of Vulcanized Rubber Sheet for Evaluation

A vulcanized rubber sheet was prepared by press-vulcanizing each of the obtained (unvulcanized) rubber compositions for 20 minutes at 160° C. in a mold (15 cm×15 cm×0.2 cm).

Heat Build-Up: Tan δ (20° C.)

The heat build-up of each vulcanized rubber test sample produced as described above was evaluated by measuring the loss tangent at a temperature of 20° C., tan δ (20° C.) using a viscoelastic spectrometer (manufactured by Toyo Seiki Seisaku-sho, Ltd.) under the following conditions: 10% initial distortion, ±2% amplitude, and 20 Hz frequency.

The results are shown in Table 2. The result is shown as an index value of a reciprocal of the obtained numerical value, and a larger value indicates superior low heat build-up when a tire is formed. Note that, in Table 2 below, the result is shown as an index with the measurement result of Standard Example 1 expressed as an index of 100. A larger index value indicates lower heat build-up and thus is preferable.

TABLE 2

| Table 2 (part by mass) | Comparative Example 1 | Example 1 | Example 2 | Comparative Example 2 | Comparative Example 3 | Comparative Example 4 | Comparative Example 5 | Comparative Example 6 | Comparative Example 7 |
|---|---|---|---|---|---|---|---|---|---|
| Natural rubber | 25.0 | 25.0 | 25.0 | 25.0 | 25.0 | 25.0 | 25.0 | 25.0 | 25.0 |
| Solution-polymerized SBR (St 37%, Vi 43%, Tg −27° C., 37.5 phr oil-extended) | 68.75 | 68.75 | 68.75 | 68.75 | 68.75 | 68.75 | 68.75 | 68.75 | 68.75 |
| BR 1 | 25.00 | | | | | | | 23.0 | 23.0 |
| BR 2 | | | | | | | | | |
| Modified BR 1 | | 25.0 | | | | | | | |
| Modified BR 2 | | | 25.0 | | | | | | |
| Modified BR 3 | | | | | | | | | |
| Comparative modified BR 1 | | | | 25.00 | | | | | |
| Comparative modified BR 2 | | | | | 27.0 (25.0) | | | | |
| Comparative modified BR 3 | | | | | | 25.0 | | | |
| Comparative modified BR 4 | | | | | | | 25.0 | | |
| Low molecular weight BR 1 | | | | | | | | 2.00 | |
| Low molecular weight BR 2 | | | | | | | | | 2.00 |
| Low molecular weight BR 3 | | | | | | | | | |
| Low molecular weight BR 4 | | | | | | | | | |
| Modified low molecular weight BR | | | | | | | | | |
| Silica | 80.00 | 80.00 | 80.00 | 80.00 | 80.00 | 80.00 | 80.00 | 80.00 | 80.00 |
| CB | 10.00 | 10.00 | 10.00 | 10.00 | 10.00 | 10.00 | 10.00 | 10.00 | 10.00 |
| Silane coupling agent | 6.40 | 6.40 | 6.40 | 6.40 | 6.40 | 6.40 | 6.40 | 6.40 | 6.40 |
| Stearic acid | 2.50 | 2.50 | 2.50 | 2.50 | 2.50 | 2.00 | 2.00 | 2.50 | 2.50 |
| Anti-aging agent | 2.00 | 2.00 | 2.00 | 2.00 | 2.00 | 2.00 | 2.00 | 2.00 | 2.00 |
| Oil | 10.00 | 8.00 | 8.00 | 8.00 | 6.00 | 8.00 | 8.00 | 8.00 | 8.00 |
| Zinc oxide | 2.50 | 2.50 | 2.50 | 2.50 | 2.50 | 2.50 | 2.50 | 2.50 | 2.50 |
| Sulfur | 2.00 | 2.00 | 2.00 | 2.00 | 2.00 | 2.00 | 2.00 | 2.00 | 2.00 |
| CZ | 2.00 | 2.00 | 2.00 | 2.00 | 2.00 | 2.00 | 2.00 | 2.00 | 2.00 |
| Converted CPN amount | 0.00 | 0.30 | 0.30 | 0.30 | 0.30 | 0.30 | 0.30 | 0.00 | 0.00 |
| Processability of modified polymer | — | A | A | B | D | D | E | — | — |
| Processability of compound (larger value indicates superior processability) | 100 | 102 | 100 | 89 | 83 | 93 | 102 | 102 | 108 |
| Heat build-up (larger value indicates lower heat build-up) | 100 | 110 | 109 | 111 | 113 | 102 | 103 | 94 | 98 |

| Table 2 (part by mass) | Comparative Example 8 | Comparative Example 9 | Comparative Example 10 | Comparative Example 11 | Comparative Example 12 | Comparative Example 13 | Comparative Example 14 | Comparative Example 15 | Example 3 |
|---|---|---|---|---|---|---|---|---|---|
| Natural rubber | 25.0 | 25.0 | 25.0 | 25.0 | 25.0 | 25.0 | 25.0 | 25.0 | 25.0 |
| Solution-polymerized SBR (St 37%, Vi 43%, Tg −27° C., 37.5 phr oil-extended) | 68.75 | 68.75 | 68.75 | 68.75 | 68.75 | 68.75 | 68.75 | 68.75 | 68.75 |
| BR 1 | 23.0 | 23.0 | 23.0 | | | | | | |
| BR 2 | | | | | | | | 25.00 | |
| Modified BR 1 | | | | | | | | | |
| Modified BR 2 | | | | | | | | | |
| Modified BR 3 | | | | | | | | | 25.00 |
| Comparative modified BR 1 | | | | 23.00 | 23.00 | 23.00 | 23.00 | | |
| Comparative modified BR 2 | | | | | | | | | |

TABLE 2-continued

| | | | | | | | | | |
|---|---|---|---|---|---|---|---|---|---|
| Comparative modified BR 3 | | | | | | | | | |
| Comparative modified BR 4 | | | | | | | | | |
| Low molecular weight BR 1 | | | | | | | | | |
| Low molecular weight BR 2 | | | 2.00 | | | | | | |
| Low molecular weight BR 3 | 2.00 | | | | | 2.00 | | | |
| Low molecular weight BR 4 | | 2.00 | | | | | 2.00 | | |
| Modified low molecular weight BR | | | | 2.00 | | | | 2.00 | |
| Silica | 80.00 | 80.00 | 80.00 | 80.00 | 80.00 | 80.00 | 80.00 | 80.00 | 80.00 |
| CB | 10.00 | 10.00 | 10.00 | 10.00 | 10.00 | 10.00 | 10.00 | 10.00 | 10.00 |
| Silane coupling agent | 6.40 | 6.40 | 6.40 | 6.40 | 6.40 | 6.40 | 6.40 | 6.40 | 6.40 |
| Stearic acid | 2.00 | 2.00 | 2.00 | 2.50 | 2.00 | 2.00 | 2.00 | 2.00 | 2.00 |
| Anti-aging agent | 2.00 | 2.00 | 2.00 | 2.00 | 2.00 | 2.00 | 2.00 | 2.00 | 2.00 |
| Oil | 8.00 | 8.00 | 8.00 | 8.00 | 8.00 | 10.00 | 10.00 | 10.00 | 10.00 |
| Zinc oxide | 2.50 | 2.50 | 2.50 | 2.50 | 2.50 | 2.50 | 2.50 | 2.50 | 2.50 |
| Sulfur | 2.00 | 2.00 | 2.00 | 2.00 | 2.00 | 2.00 | 2.00 | 2.00 | 2.00 |
| CZ | 2.00 | 2.00 | 2.00 | 2.00 | 2.00 | 2.00 | 2.00 | 2.00 | 2.00 |
| Converted CPN amount | 0.00 | 0.00 | 0.02 | 0.27 | 0.27 | 0.27 | 0.30 | 0.30 | 0.30 |
| Processability of modified polymer | — | — | — | B | B | B | B | A | A |
| Processability of compound (larger value indicates superior processability) | 98 | 100 | 102 | 89 | 90 | 90 | 95 | 106 | 103 |
| Heat build-up (larger value indicates lower heat build-up) | 96 | 95 | 101 | 107 | 105 | 109 | 104 | 95 | 114 |

The details of each component shown in Table 2 above are as follows.

Natural rubber: TSR20

Solution-polymerized SBR: E581 (oil extender content per 100 parts by mass of rubber component: 37.5 parts by mass (rubber component in the 68.75 parts by mass: 50 parts by mass); styrene content: 37 mass %; vinyl content: 43 mass %; glass transition temperature: −27° C. (manufactured by Asahi Kasei Corporation))

BR 1: Nipol BR 1220 (number average molecular weight: $1.8 \times 10^5$; manufactured by Zeon Corporation)

BR 2: Nipol BRX 5000 (a product obtained by blending 40 parts by mass of low molecular weight butadiene rubber (weight average molecular weight: $2.0 \times 10^4$; number average molecular weight: $1.1 \times 10^4$) to 100 parts by mass of high molecular weight butadiene rubber (weight average molecular weight: $7.4 \times 10^5$; number average molecular weight: $2.5 \times 10^5$) (manufactured by Zeon Corporation))

Modified BRs 1 to 3 and comparative modified BRs 1 to 4: Modified butadiene rubbers described in Table 1 above Low molecular weight BR 1: Ricon 130 (vinyl bond content: 28 mol %; number average molecular weight: 2500 (manufactured by Cray Valley))

Low molecular weight BR 2: Ricon 142 (vinyl bond content: 55 mol %; number average molecular weight: 3900 (manufactured by Cray Valley))

Low molecular weight BR 3: Ricon 150 (vinyl bond content: 70 mol %; number average molecular weight: 3900 (manufactured by Cray Valley))

Low molecular weight BR 4: Ricon 154 (vinyl bond content: 90 mol %; number average molecular weight: 5200 (manufactured by Cray Valley))

Modified low molecular weight BR: nitrone-modified product of low molecular weight BR 1 synthesized by the method described above Silica: Zeosil 1165 MP (nitrogen adsorption specific surface area: 160 $m^2/g$; CTAB specific surface area: 159 $m^2/g$; DBP absorption: 200 mL/100 g; $N_2SA/CTAB$: 1.0)

Carbon black: Show Black N339 (CTAB adsorption specific surface area: 90 $m^2/g$, manufactured by Cabot Japan K.K.)

Silane coupling agent: Si69, manufactured by Evonik Degussa; bis(3-triethoxysilylpropyl)tetrasulfide Stearic acid: Stearic acid YR (manufactured by NOF Corporation)

Anti-aging agent: Santoflex 6PPD (manufactured by Flexsys)

Oil: Extract No. 4S (manufactured by Showa Shell Sekiyu K.K.)

Zinc oxide: Zinc Oxide III (manufactured by Seido Chemical Industry Co., Ltd.)

Sulfur: Oil treatment sulfur (manufactured by Karuizawa Refinery Ltd.)

Vulcanization accelerator (CZ): Nocceler CZ-G (manufactured by Ouchi Shinko Chemical Industrial Co., Ltd.)

As is clear from the results shown in Table 2 above, it was found that the rubber compositions using the modified butadiene rubbers (modified BRs 1, 2, and 3) obtained by modifying butadiene rubber having a predetermined amount of a low molecular weight butadiene rubber having particular characteristics with a nitrone compound achieved excellent processability of the compound and excellent low heat build-up.

To discuss the results shown above in more detail, the rubber compositions of Examples 1 to 3 and Comparative Examples 1 to 5, in which the butadiene rubber component was modified with a carboxy group-containing nitrone compound, exhibited excellent low heat build-up compared to those of the rubber compositions of Standard Example 1 and Comparative Examples 6 to 9 and 15, in which the butadiene rubber component was not modified with a carboxy group-containing nitrone. At this time, as shown by the rubber compositions of Examples 1 to 3, by allowing a low molecular weight butadiene rubber having predetermined vinyl bond content and number average molecular weight to be contained in the butadiene rubber, the processability of the compound can be further enhanced.

On the other hand, as is clear from the results of Comparative Examples 11 to 13, it was found that the processability of the compound was not improved when, among the blended butadiene rubbers, butadiene rubber other than the low molecular weight butadiene rubber was modified with a carboxy group-containing nitrone compound, and the low molecular weight butadiene rubber was not modified and added in the later step.

Furthermore, as is clear from the results of Comparative Example 14, it was found that the processability of the compound was not improved when the low molecular weight butadiene rubber modified with a carboxy group-containing nitrone and the high molecular weight butadiene rubber modified with a carboxy group-containing nitrone were mixed.

Furthermore, as is clear from the results of Comparative Example 10, when a substance obtained by modifying the low molecular weight butadiene rubber with a carboxy group-containing nitrone compound was blended in an unmodified high molecular weight butadiene, no effect was observed on lowering of the heat build-up since sufficient amount of the nitrone was not blended in the composition.

The invention claimed is:

1. A rubber composition comprising: a diene rubber containing from 5 to 70 mass % of a modified butadiene rubber obtained by modifying an unmodified butadiene rubber (A) with a carboxy group-containing nitrone compound (B), the unmodified butadiene rubber (A) containing from 2 to 45 parts by mass of an unmodified low molecular weight butadiene rubber (A1) having from 1.5 to 60 mol % of vinyl bonding and having a number average molecular weight (Mn) of 2000 to 60000 per 100 parts by mass of an unmodified butadiene rubber (A2) having a number average molecular weight (Mn) greater than the number average molecular weight (Mn) of the unmodified low molecular weight butadiene rubber (A1),
wherein the modified butadiene rubber is obtained by a cycloaddition reaction between a double bond derived from a conjugated diene contained in the unmodified butadiene rubber (A) and the nitrone compound (B).

2. The rubber composition according to claim 1 further comprising a white filler.

3. The rubber composition according to claim 2, wherein a content of the white filler is from 8 to 130 parts by mass per 100 parts by mass of the modified butadiene rubber.

4. The rubber composition according to claim 2, wherein the nitrone compound (B) is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

5. The rubber composition according to claim 2, wherein a degree of modification of the modified butadiene rubber is from 0.01 to 2.0 mol %,
the degree of modification representing a proportion (mol %) of double bonds modified with the nitrone compound (B) relative to all the double bonds derived from conjugated diene contained in the unmodified butadiene rubber (A).

6. The rubber composition according to claim 2, wherein an amount of the nitrone compound (B) reacted to the unmodified butadiene rubber (A) is from 0.3 parts by mass to 10 parts by mass per 100 parts by mass of the unmodified butadiene rubber (A).

7. The rubber composition according to claim 1, wherein the nitrone compound (B) is a compound selected from the group consisting of N-phenyl-α-(4-carboxyphenyl) nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

8. The rubber composition according to claim 7, wherein
a degree of modification of the modified butadiene rubber is from 0.01 to 2.0 mol %,
the degree of modification representing a proportion (mol %) of double bonds modified with the nitrone compound (B) relative to all the double bonds derived from conjugated diene contained in the unmodified butadiene rubber (A).

9. The rubber composition according to claim 7, wherein an amount of the nitrone compound (B) reacted to the unmodified butadiene rubber (A) is from 0.3 parts by mass to 10 parts by mass per 100 parts by mass of the unmodified butadiene rubber (A).

10. The rubber composition according to claim 7, wherein a content of the white filler is from 8 to 130 parts by mass per 100 parts by mass of the modified butadiene rubber.

11. The rubber composition according to claim 1, wherein
a degree of modification of the modified butadiene rubber is from 0.01 to 2.0 mol %,
the degree of modification representing a proportion (mol %) of double bonds modified with the nitrone compound (B) relative to all the double bonds derived from conjugated diene contained in the unmodified butadiene rubber (A).

12. The rubber composition according to claim 11, wherein an amount of the nitrone compound (B) reacted to the unmodified butadiene rubber (A) is from 0.3 parts by mass to 10 parts by mass per 100 parts by mass of the unmodified butadiene rubber (A).

13. The rubber composition according to claim 11, wherein a content of the white filler is from 8 to 130 parts by mass per 100 parts by mass of the modified butadiene rubber.

14. The rubber composition according to claim 1, wherein an amount of the nitrone compound (B) reacted to the unmodified butadiene rubber (A) is from 0.3 parts by mass to 10 parts by mass per 100 parts by mass of the unmodified butadiene rubber (A).

15. The rubber composition according to claim 14, wherein a content of the white filler is from 8 to 130 parts by mass per 100 parts by mass of the modified butadiene rubber.

16. A pneumatic tire using the rubber composition described in claim 1.

17. A pneumatic tire using the rubber composition described in claim 2.

18. A pneumatic tire using the rubber composition described in claim 7.

19. A pneumatic tire using the rubber composition described in claim 11.

20. A pneumatic tire using the rubber composition described in claim 14.

* * * * *